May 17, 1927. 1,629,252
V. BOUZA
SYNCHRONIZING MECHANISM FOR TALKING AND MOTION PICTURE MACHINES
Original Filed May 21, 1923
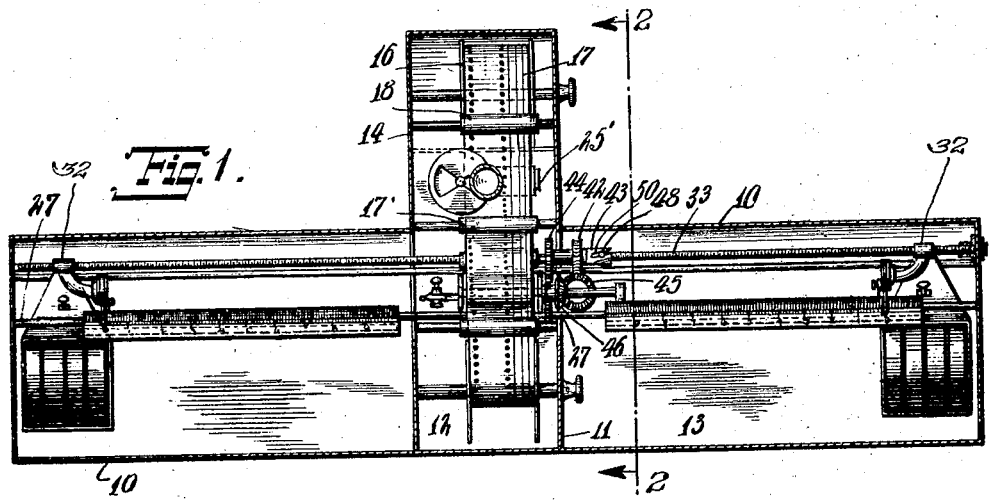
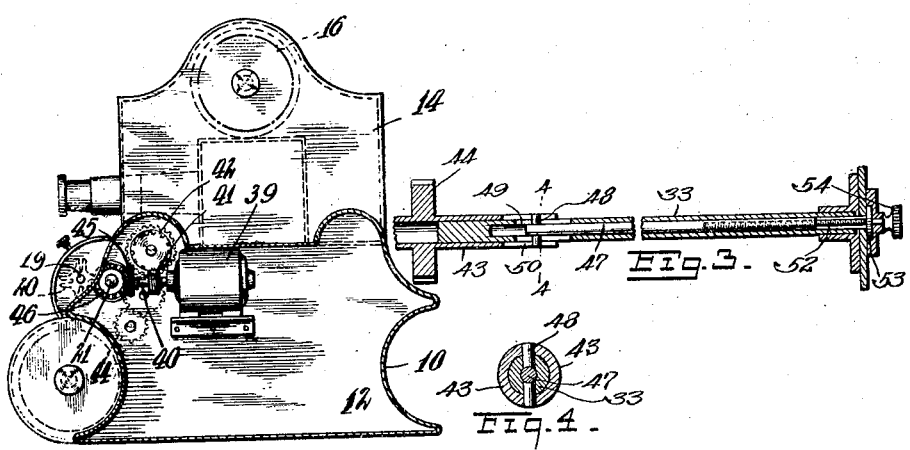

Patented May 17, 1927.

1,629,252

UNITED STATES PATENT OFFICE.

VICENTE BOUZA, OF HIGHLAND PARK, MICHIGAN.

SYNCHRONIZING MECHANISM FOR TALKING AND MOTION-PICTURE MACHINES.

Application filed May 21, 1923, Serial No. 640,336. Renewed January 6, 1927.

This invention relates to a synchronized phonograph and motion picture projector, which are united in a unitary machine with a common drive mechanism for operating the film and the sound record.

The invention has as its object the providing of a novel and simple means for synchronizing the film and sound record.

For further comprehension of the invention and of the objects and advantages thereof, reference will be had to the following description and accompanying drawings, and to the appended claims in which the various novel features of the invention are more particularly set forth.

Fig. 1 is a front elevational view of the machine, showing the enclosing casing in longitudinal section.

Fig. 2 is a transverse sectional view taken on the line 2—2 of Fig. 1.

Fig. 3 is a fragmentary longitudinal sectional view showing the variable connection between the film drive and record drive whereby the film and record may be synchronized while the machine is in operation.

Fig. 4 is a transverse sectional view taken on the line 4—4 of Fig. 3.

As here embodied my improved synchronized phonograph and motion picture projector comprises an elongated casing 10 which has a pair of transverse partitions 11 extending thereacross a short distance on opposite sides of the centre of the casing which is thus divided into a small centre chamber 12 and larger side chambers 13. Formed on the top of the casing, above the centre chamber 12, is an upwardly projected housing 14 which contains part of the motion picture projection apparatus, the remainder being contained within the chamber 12.

The motion picture projection apparatus is of the usual type and need not be described in detail. I have here shown a pair of reels 16 for the film, one of which is contained in the housing 14 and the other in the chamber 12, the film being indicated at 17 as passing between the usual guide rollers 17′ and 18 around a feed sprocket roller 19 fixed on a shaft which receives intermittent movement, through the usual means indicated generally at 20, from a constantly rotating shaft 21. The usual shutter is shown at 24 while I have provided a slide 25′ in the housing 14 which may be used to cut off the beams from the lamp.

For driving the mechanism I provide an electric motor 39 which is suitably mounted in the casing 10 and whose shaft 40 extends transversely of the casing and has fixed thereto the worm pinion 41 which meshes with a worm gear 42 on a hollow shaft element 43 enclosing the shaft 33 and having a novel synchronizing clutch connection therewith. The shaft 43 drives the shaft 27 through the train of gears indicated generally at 44. On the end of shaft 40 is a bevel gear 45 meshing with a like gear 46 on the shaft 21.

My improved synchronizing clutch connection between hollow shaft 43 and the threaded shaft 33 is effected by providing in said shaft 33 the slidable rod 47 which has a pin 48 on one end passing through longitudinal slots 49 in the shaft 33 and into spirally inclined slots 50 entered from one end of shaft 43 toward the middle thereof. The rod 47 in turn is formed with a threaded socket which receives a screw 52 swiveled as indicated at 53 in the end wall of the casing and having an exterior adjusting head 54 thereon. As will be apparent a slight synchronizing movement can be had while the machine is running by simply turning screw 52 to move the rod 47 in the shaft 33 and so cause a relative rotation of the shafts 33 and 43 by the pin 48 sliding along the spiral slots 50. Any desired degree of synchronizing adjustment can be had by stopping the machine, drawing the rod 47 back until the pin 48 is free of the shaft 43 rotating the shaft 33 and then re-engaging the pin with the adjacent slot 50.

Having thus described my invention what I claim as new and desire to protect by Letters Patent of the United States is as follows:

1. In combination with a pair of devices to be operated in unison, a common drive means for said devices, and synchronizing means therefor including a pair of shafts alined with one another, one of said shafts being hollow and the other projecting thereinto, a rod slidable in the last named shaft, a pin on said rod engaging in a spiral slot entered into the hollow shaft from the end thereof, and a screw engaged with said rod for moving it longitudinally in the said shaft.

2. In combination with a pair of devices to be operated in unison, a common drive means for said devices, and synchronizing means therefor including a pair of alined shafts one of which is hollow, the other shaft passing through the hollow shaft, said hollow shaft being formed with a spiral slot, and an element slidable and non-rotatable in an axial boring in said other shaft, and having a pin fixed thereon and projecting through a longitudinal slot in the said other shaft into the spiral slot in the hollow shaft, said element comprising a rod having a threaded socket entered thereinto from one end thereof, and a screw mounted for rotation and held against longitudinal movement engaging in said threaded socket to adjust the said rod and with it the said pin longitudinally with respect to the hollow shaft.

In testimony whereof I have affixed my signature.

VICENTE BOUZA.